United States Patent
Ramesh et al.

(10) Patent No.: US 12,093,717 B2
(45) Date of Patent: Sep. 17, 2024

(54) ASSIGNING A VIRTUAL DISK TO A VIRTUAL MACHINE HOSTED ON A COMPUTE NODE FOR IMPROVED NETWORK PERFORMANCE

(71) Applicant: Nutanix, Inc., San Jose, CA (US)

(72) Inventors: Aditya Ramesh, San Jose, CA (US); Ashwin Thennaram Vakkayil, Kerala (IN); Gaurav Poothia, Redmond, WA (US); Gokul Kannan, Bellevue, WA (US); Hemanth Kumar Mantri, Fremont, CA (US); Kamalneet Singh, Bangalore (IN); Robert Schwenz, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 443 days.

(21) Appl. No.: 17/500,771

(22) Filed: Oct. 13, 2021

(65) Prior Publication Data
US 2022/0100551 A1    Mar. 31, 2022

Related U.S. Application Data

(63) Continuation of application No. 16/267,262, filed on Feb. 4, 2019, now Pat. No. 11,150,932.

(51) Int. Cl.
G06F 9/46 (2006.01)
G06F 3/06 (2006.01)
G06F 9/455 (2018.01)

(52) U.S. Cl.
CPC ........ *G06F 9/45558* (2013.01); *G06F 3/0613* (2013.01); *G06F 3/0664* (2013.01); (Continued)

(58) Field of Classification Search
None
See application file for complete search history.

(56) References Cited

U.S. PATENT DOCUMENTS

| 6,115,830 A | 9/2000 | Zabarsky et al. |
| 7,484,208 B1 | 1/2009 | Nelson |

(Continued)

FOREIGN PATENT DOCUMENTS

WO    WO-2012/100544    8/2012

OTHER PUBLICATIONS

Cano, Ignacio, et al. "Curator: Self-Managing Storage for Enterprise Clusters" (Mar. 27, 2017), from www.usenix.org/conference/nsdi17/.

(Continued)

*Primary Examiner* — Bing Zhao
(74) *Attorney, Agent, or Firm* — Foley & Lardner LLP

(57) ABSTRACT

A system and method include classifying and assigning virtual disks accessed from compute only nodes. The method determines, by a management processor of a virtual computing system, characteristics for a plurality of virtual disks hosted on a plurality of hyper converged nodes in a cluster of nodes in the virtual computing system. The method further classifies, by the management processor, each of the plurality of virtual disks based on the determined characteristics and identifies, by the management processor, one of the plurality of virtual disks to host data for a virtual machine on a compute only node based on the classification to spread out input-output demand in the cluster, reducing probability of input-output bottlenecks and increasing cluster-wide storage throughput. The method also assigns, by the management processor, the identified virtual disk to host data for the virtual machine located on the compute only node.

20 Claims, 5 Drawing Sheets

(52) U.S. Cl.
CPC ...... *G06F 3/067* (2013.01); *G06F 2009/4557* (2013.01); *G06F 2009/45595* (2013.01)

(56) References Cited

U.S. PATENT DOCUMENTS

| | | | |
|---|---|---|---|
| 8,010,337 | B2 | 8/2011 | Narayanan et al. |
| 8,027,354 | B1 | 9/2011 | Portolani et al. |
| 8,095,929 | B1 | 1/2012 | Ji et al. |
| 8,122,158 | B1 | 2/2012 | Kudva et al. |
| 8,195,976 | B2 | 6/2012 | Rao et al. |
| 8,291,159 | B2 | 10/2012 | Rajagopal et al. |
| 8,307,187 | B2 | 11/2012 | Chawla et al. |
| 8,549,518 | B1 | 10/2013 | Aron et al. |
| 8,572,138 | B2 | 10/2013 | Sundar et al. |
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,027,024 | B2 | 5/2015 | Mick et al. |
| 9,069,708 | B2 | 6/2015 | Gill et al. |
| 9,172,588 | B2 | 10/2015 | Kalyanaraman et al. |
| 9,176,829 | B2 | 11/2015 | Jain et al. |
| 9,223,634 | B2 | 12/2015 | Chang et al. |
| 9,294,407 | B2 | 3/2016 | Antony |
| 9,336,132 | B1 | 5/2016 | Aron et al. |
| 9,411,626 | B2 | 8/2016 | Ghosh et al. |
| 9,582,297 | B2 | 2/2017 | Jin et al. |
| 9,652,265 | B1 | 5/2017 | Narayanasamy et al. |
| 9,747,176 | B2 | 8/2017 | Oppermann |
| 9,747,287 | B1 | 8/2017 | Bhardwaj et al. |
| 9,772,866 | B1 | 9/2017 | Aron et al. |
| 9,819,607 | B2 | 11/2017 | Tripathi et al. |
| 9,823,943 | B2 | 11/2017 | Mitsunobu et al. |
| 9,836,234 | B2 | 12/2017 | Colgrove et al. |
| 9,848,041 | B2 | 12/2017 | Einkauf et al. |
| 9,910,696 | B2 | 3/2018 | Dow et al. |
| 10,002,058 | B1 | 6/2018 | Shanmugam et al. |
| 10,127,295 | B2 | 11/2018 | Calder et al. |
| 10,228,984 | B2 | 3/2019 | Anderson et al. |
| 10,263,842 | B2 | 4/2019 | Bursell |
| 10,305,747 | B2 | 5/2019 | Shahab et al. |
| 10,318,166 | B1 | 6/2019 | Tummala et al. |
| 10,346,252 | B1 | 7/2019 | Gould et al. |
| 10,372,565 | B2 | 8/2019 | Peng et al. |
| 10,671,445 | B2 | 6/2020 | Nucci et al. |
| 2006/0130042 | A1 | 6/2006 | Dias et al. |
| 2007/0233698 | A1 | 10/2007 | Sundar et al. |
| 2010/0250824 | A1 | 9/2010 | Belay |
| 2011/0225277 | A1 | 9/2011 | Freimuth et al. |
| 2012/0079226 | A1 | 3/2012 | Kihara et al. |
| 2013/0258843 | A1 | 10/2013 | Kurita |
| 2014/0223122 | A1 | 8/2014 | Butt et al. |
| 2015/0089504 | A1 | 3/2015 | Hartman et al. |
| 2015/0331635 | A1* | 11/2015 | Ben-Shaul .............. G06F 3/067 711/120 |
| 2016/0011898 | A1 | 1/2016 | Lee et al. |
| 2016/0179635 | A1 | 6/2016 | Kondalsamy et al. |
| 2016/0204977 | A1 | 7/2016 | Cui et al. |
| 2016/0246528 | A1 | 8/2016 | Colgrove et al. |
| 2016/0323377 | A1 | 11/2016 | Einkauf et al. |
| 2016/0378622 | A1 | 12/2016 | Ren et al. |
| 2017/0149875 | A1 | 5/2017 | Iyengar et al. |
| 2017/0359270 | A1 | 12/2017 | Buil et al. |
| 2018/0060098 | A1 | 3/2018 | Atia et al. |
| 2018/0095776 | A1 | 4/2018 | Tsai et al. |
| 2018/0157521 | A1 | 6/2018 | Arikatla et al. |
| 2018/0165166 | A1 | 6/2018 | Wang et al. |
| 2018/0232249 | A1* | 8/2018 | Keohane .............. G06F 9/5077 |
| 2018/0302340 | A1 | 10/2018 | Alvarez Callau et al. |
| 2018/0307512 | A1 | 10/2018 | Balma et al. |
| 2019/0235978 | A1 | 8/2019 | Wu et al. |
| 2019/0278628 | A1 | 9/2019 | Ahmed et al. |
| 2019/0317869 | A1 | 10/2019 | Selvaraj et al. |
| 2020/0034063 | A1 | 1/2020 | Somasundaram et al. |
| 2020/0142753 | A1 | 5/2020 | Harwood et al. |
| 2020/0150946 | A1 | 5/2020 | Olderdissen et al. |

OTHER PUBLICATIONS

Cisco Public "Cisco Hyperflex HX Data Platform" Cisco Public White Paper (accessed Jan. 20, 2020) from www.cisco.com/c/dam/en/us/products/collateral/hyperconverged-infrastructure/hyperflex-hx-series/white-paper-c11-736814.pdf (published 2017).

Epping, D. "Scale Up/Out and Impact of vRam ?!? (part 2)", Yellow-Bricks.com [online], 2011 [retrieved May 9, 2020] Retrieved from Internet: www.yellow-bricks.com/20110/07/21/scale-upout-and-impact-of-vram-part-2 May 9, 2020, pp. 1-6.—cited in IDS dated Sep. 9, 2020.

Everitt et al., Cisco Hyperflex 2.5 for virtual server infastructure—Deployment Guide, Sep. 2017 (Year: 2017).

Gulati, Ajay et al. "Modeling Workloads and Devices for IO Load Balancing in Virtualized Environments" ACM Sigmetrics Performance Evaluation Review (ACM 10), 2010, vol. 37, No. 3, pp. 61-66. DOI: 10.1145/1710115.1710127.

Ji et al., "Network-aware Virtual Machine Allocation for Cloud Data Centers", Oct. 2017, pp. 105-109, ACM. (Year: 2017).

Liao, Jianwei et al. "Dynamic Process Migration Based on Block Access Patterns Occurring in Storage Servers" ACM Transactions on Architecture and Code Optimization (ACM 16), 2016, vol. 13, No. 2, pp. 20. DOI: 10.1145/2899002.

Meng et al., "Improving the Scalability of Data Center Networks with Traffic-aware Virtual Machine Placement", 2010, IEEE. (Year: 2010).

Nichols et al.—HyperFlex Data Program—Technical Deep Dive BRKINI-3010, Jun. 25, 2017 (Year:2017).

Odgers, Josh. "Nutanix Scalability—Part 2—Compute (CPU/RAM)" (Published Jun. 21, 2018), from www.joshodgers.com/2018/06/21/nutanix-scalability-part-2-compute-cpuram/ (Retrieved Nov. 11, 2019) 7 pgs.

Odgers, Josh. "Scaling Hyper-converged solutions—Compute only." (Jul. 24, 2015), from www.joshodgers.com/2015/07/24/scaling-hyper-converged-solutions-compute-only/ (Retrieved Nov. 11, 2019) 6 pgs.

Odgers, Josh. "Solving Oracle & SQL Licensing challenges with Nutanix" (Published Feb. 20, 2019), from www.joshodgers.com/2019/02/20/solving-oracle-sql-licensing-challenges-with-nutanix/ (Retrieved Nov. 11, 2019) 6 pgs.

Poitras, Steven. "The Nutanix Bible" (Jan. 11, 2014), from stevenpoitras.com/the-nutanix-bible/ (Publication date based on indicated capture date by Archive.org; first publication date unknown).

Poitras, Steven. "The Nutanix Bible" (Oct. 15, 2013), from stevenpoitras.com/the-nutanix-bible/ (Publication date based on indicated capture date by Archive.org; first publication date unknown).

Poitras, Steven. "The Nutanix Bible" (Sep. 17, 2019), from nutanixbible.com/.

Poitras, Steven. "The Nutanix Bible" (Jun. 20, 2014), from stevenpoitras.com/the-nutanix-bible/ (Publication date based on indicated capture date by Archive.org; first publication date unknown).

Poitras, Steven. "The Nutanix Bible" (Jan. 7, 2015), from stevenpoitras.com/the-nutanix-bible/ (Publication date based on indicated capture date by Archive.org; first publication date unknown).

Poitras, Steven. "The Nutanix Bible" (Jun. 9, 2015), from stevenpoitras.com/the-nutanix-bible/ (Publication date based on indicated capture date by Archive.org; first publication date unknown).

R. A. Mat Razali, R. Ab Rahman, N. Zaini, M. Samad, "Virtual Machine Migration Implementation in Load Balancing for Cloud Computing" 2014 5th International Conference on Intelligent and Advanced Systems (Icias). IEEE, 2014.

Red Hat "Chapter 11. Migrating Virtual Machines Between Compute Nodes" Red Hat OpenStack Platform Director Installation and Usage Guide. (accessed Jan. 22, 2020) from access.redhat.com/documentation/en-us/red_hat_openstack_platform/13/html/director_installation_and_usage/migrating-virtual-machines-between-compute-nodes-osp (published 2020).

S. R. Patel, K. J. Panchal, "Virtual Machine Migration Strategy for Load Balancing in Cloud Computing," IJARIIE-ISSN(O)-2395-4396 vol. 3 Issue 2 2017. (IJARIIE). 2017.

(56) References Cited

OTHER PUBLICATIONS

S. Xiao et al., "Traffic-aware virtual machine migration in topology-adaptive DCN", Proc. IEEE 24th Int. Conf. Netw. Protocols (ICNP), pp. 1-10, 2016 (Year: 2016).
The Nutanix Bible; from nutanixbible.com/; accessed on Jan. 12, 2016.
The Nutanix Bible; from nutanixbible.com/; accessed on Jun. 25, 2018.
The Nutanix Bible; from nutanixbible.com/; accessed on Jan. 3, 2017.
The Nutanix Bible; from nutanixbible.com/; accessed on Jan. 3, 2018.
The Nutanix Bible; from nutanixbible.com/; accessed on Sep. 4, 2015.
The Nutanix Bible; from nutanixbible.com/; accessed on Jan. 8, 2019.
The Nutanix Bible; from nutanixbible.com/; accessed on Jun. 8, 2017.
The Nutanix Bible; from nutanixbible.com/; accessed on Jun. 9, 2016.
United States Arm Research Laboratory "Dynamically Allocated Virtual Clustering Management System (DAVC)"; www.arl.army.mil.www/default.cfm?page=2488 [retrieved Aug. 13, 2021] Retrieved from Internet Archive [https://web.archive.org/web/20171017023707/https://www.arl.army.mil/www/default.cfm?page=2488], Jun. 5, 2020, pp. all—cited in IDS dated Sep. 9, 2020.

* cited by examiner

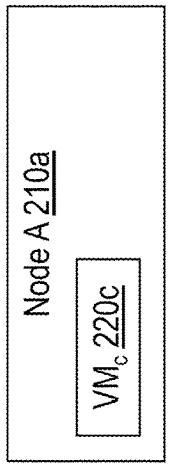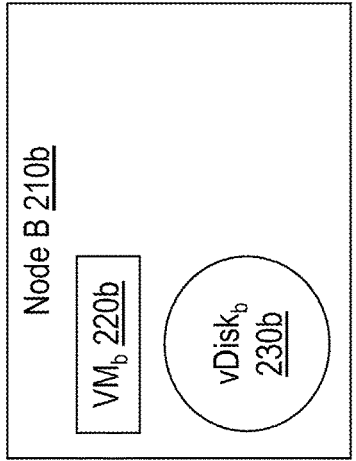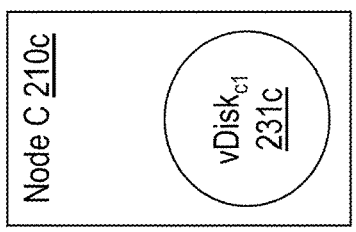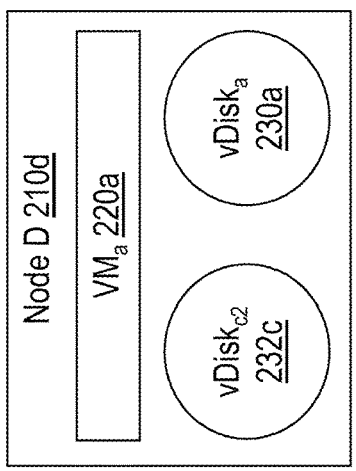
FIG. 2A
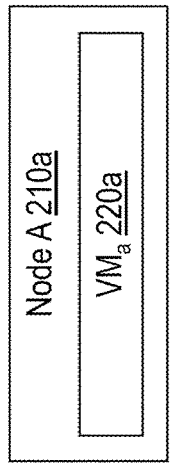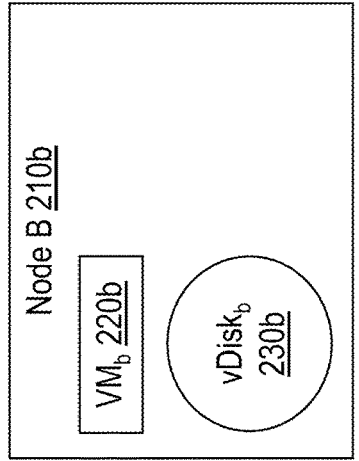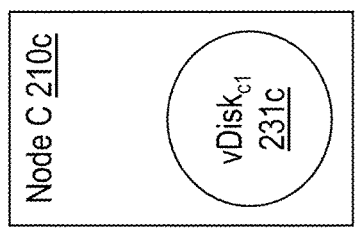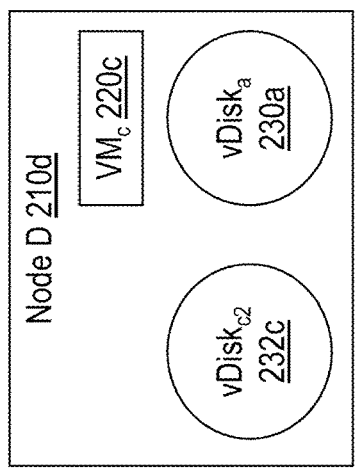
FIG. 2B

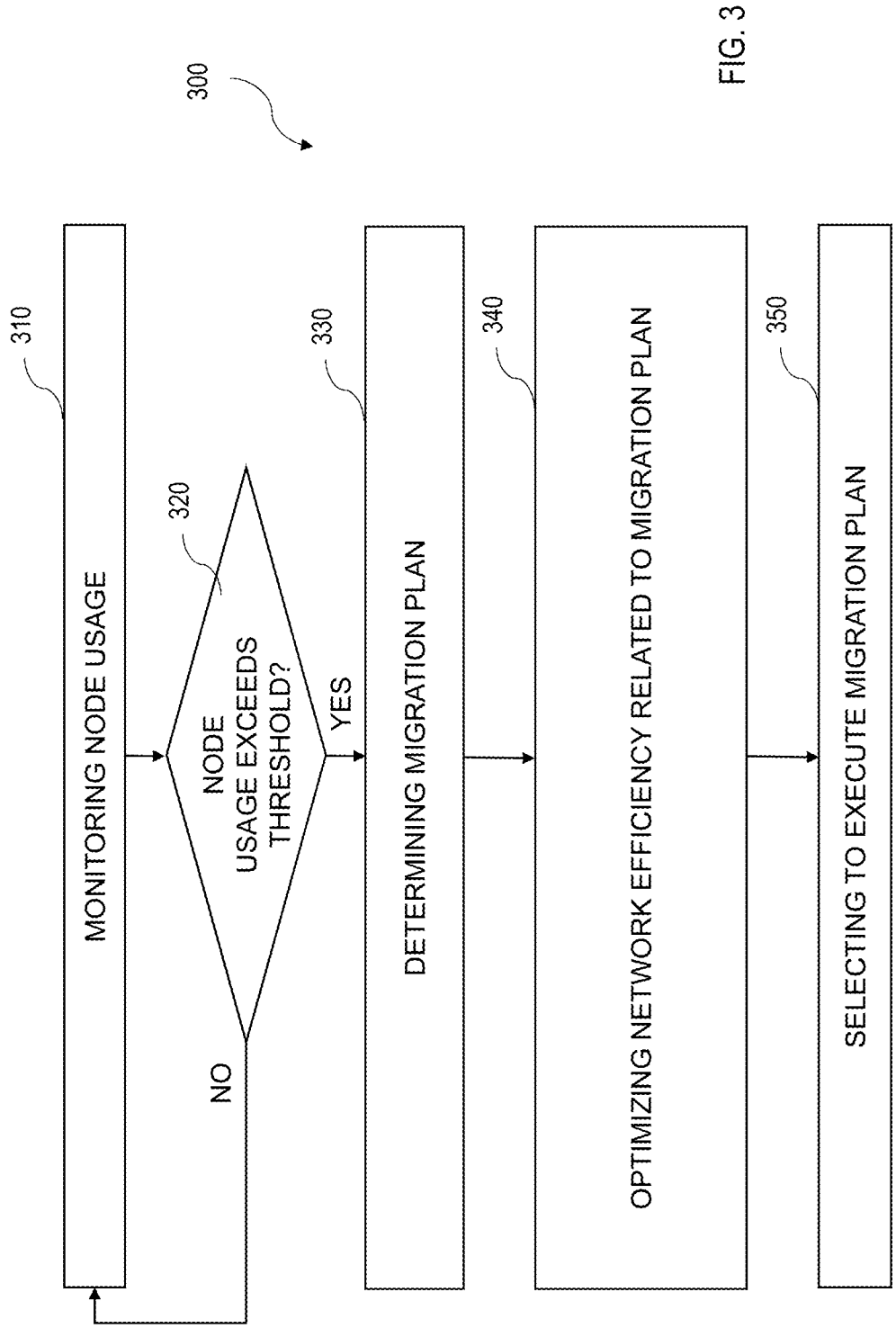

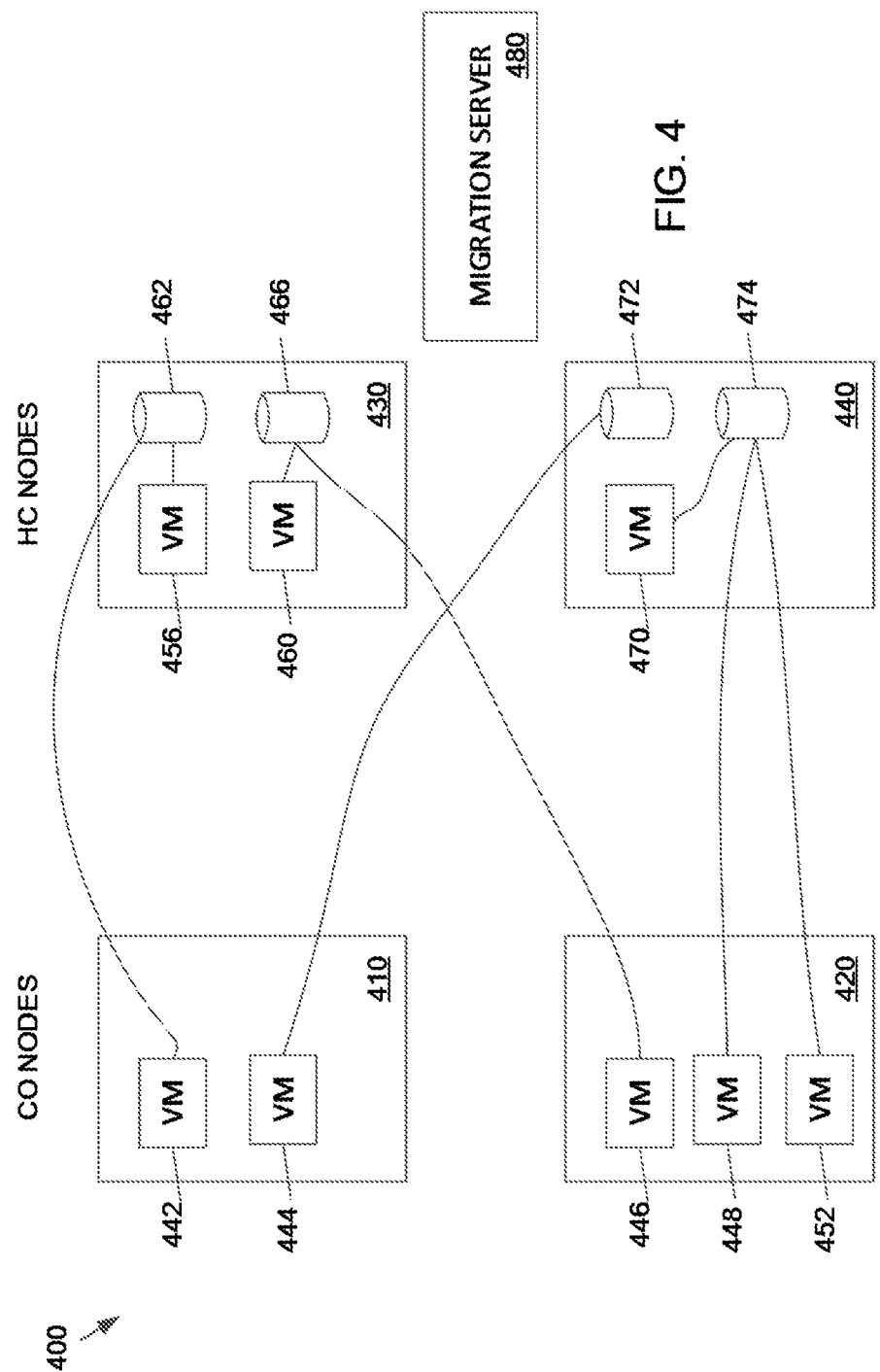

ASSIGNING A VIRTUAL DISK TO A VIRTUAL MACHINE HOSTED ON A COMPUTE NODE FOR IMPROVED NETWORK PERFORMANCE

CROSS REFERENCE TO RELATED APPLICATIONS

This application is a continuation of U.S. patent application Ser. No. 16/267,262 filed Feb. 4, 2019, entitled "Virtual Disk Management for Virtual Disks Accessed from Compute Only Nodes," the contents of which are incorporated herein by reference in their entirety.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

A node (e.g., a host, a machine, a computer, and so on) can be configured to run one or more instances of virtual machines (VMs) by virtualizing or otherwise transforming hardware of the node into resources for the VMs. A node can further run one or more file storages (e.g., vDisks) that store files or data for the VMs located on the same node or VMs located on a different node. A given VM or vDisk can be migrated from an original host to a destination host. A VM and a vDisk can migrate due to various reasons such as but not limited to, reducing load of the original host when the original host becomes a hotspot, hypervisor upgrade of the original host, state cleanup of the original host, component change or upgrade of the original host, maintaining the original host, planned or abrupt power-off of the original host, and so on. In one example, VMs can be migrated to minimize inter-VM communications over a network. A VM can be migrated from an original host to a destination host by copying data (e.g., memory, virtualized hardware state data, and so on) associated with the VM from the original host to the destination host, such that the destination host can use hardware resources of the destination host to run the VM. In a VM live-migration, the VM (e.g., the compute portion) is migrated while the vDisk (e.g., the storage portion) may remain on a same node. In some cases, the data associated with VM is communicated from the original host to the destination host via a network.

Conventional systems migrate VMs while minimizing performance disruption, and ignore network traffic generated by migrating the VMs. Therefore, in some instances, a physical network card of a given node can be saturated by co-locating VMs that send or receive a considerable amount of data or co-locating VMs that rely heavily on remote I/Os. Network traffic significantly increases as the number of VMs that are migrated and the amount of data for associated with VM to be migrated increase. Increased network traffic can further result in network congestion and degradation of performance of nodes connected to the network. As such, there is a trade-off between an expected network traffic reduction resulting from the VM migration and the network usage due the VM migration process.

SUMMARY

In accordance with at least some aspects of the present disclosure, a method for classifying and assigning virtual disks accessed from compute only nodes is disclosed. The method determines, by a management processor of a virtual computing system, characteristics for a plurality of virtual disks hosted on a plurality of hyper converged nodes in a cluster of nodes in the virtual computing system. The method further classifies, by the management processor, each of the plurality of virtual disks based on the determined characteristics and identifies, by the management processor, one of the plurality of virtual disks to host data for a virtual machine on a compute only node based on the classification to spread out input-output demand in the cluster, reducing probability of input-output bottlenecks and increasing cluster-wide storage throughput. The method also assigns, by the management processor, the identified virtual disk to host data for the virtual machine located on the compute only node.

In accordance with some other aspects of the present disclosure, a migration server for classifying and assigning virtual disks accessed from compute only nodes is disclosed. The migration server includes a processing unit having a processor and a memory. The processing unit is configured to determine characteristics for a plurality of virtual disks hosted on a plurality of hyper converged nodes in a cluster of nodes in the virtual computing system; classify each of the plurality of virtual disks based on the determined characteristics; identify one of the plurality of virtual disks to host data for a virtual machine on a compute only node based on the classification to spread out input-output demand in the cluster, reducing probability of input-output bottlenecks and increasing cluster-wide storage throughput; and assign the identified virtual disk to host data for the virtual machine located on the compute only node.

In accordance with yet other embodiments of the present disclosure, a non-transitory computer readable media is disclosed. The non-transitory computer readable media includes computer-executable instructions that, when executed by a processor of an entity management system of a virtual computing system, cause the entity management system to perform a process. The process includes determining characteristics for a plurality of virtual disks hosted on a plurality of hyper converged nodes in a cluster of nodes in the virtual computing system; classifying each of the plurality of virtual disks based on the determined characteristics; identifying one of the plurality of virtual disks to host data for a virtual machine on a compute only node based on the classification to spread out input-output demand in the cluster, reducing probability of input-output bottlenecks and increasing cluster-wide storage throughput; and assigning the identified virtual disk to host data for the virtual machine located on the compute only node.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 2A is a block diagram illustrating example locations of VMs and file storages before one or more VMs are migrated, in accordance with some implementations of the present disclosure.

FIG. 2B is a block diagram illustrating example locations of VMs and file storages after one or more VMs are migrated, in accordance with some implementations of the present disclosure.

FIG. 3 is a flowchart outlining operations for optimizing virtual migration, in accordance with some implementations of the present disclosure FIG. 4 is another block diagram of a virtual computing system showing compute only nodes and hyper converged nodes in a cluster, in accordance with some embodiments of the present disclosure.

Figure 1:
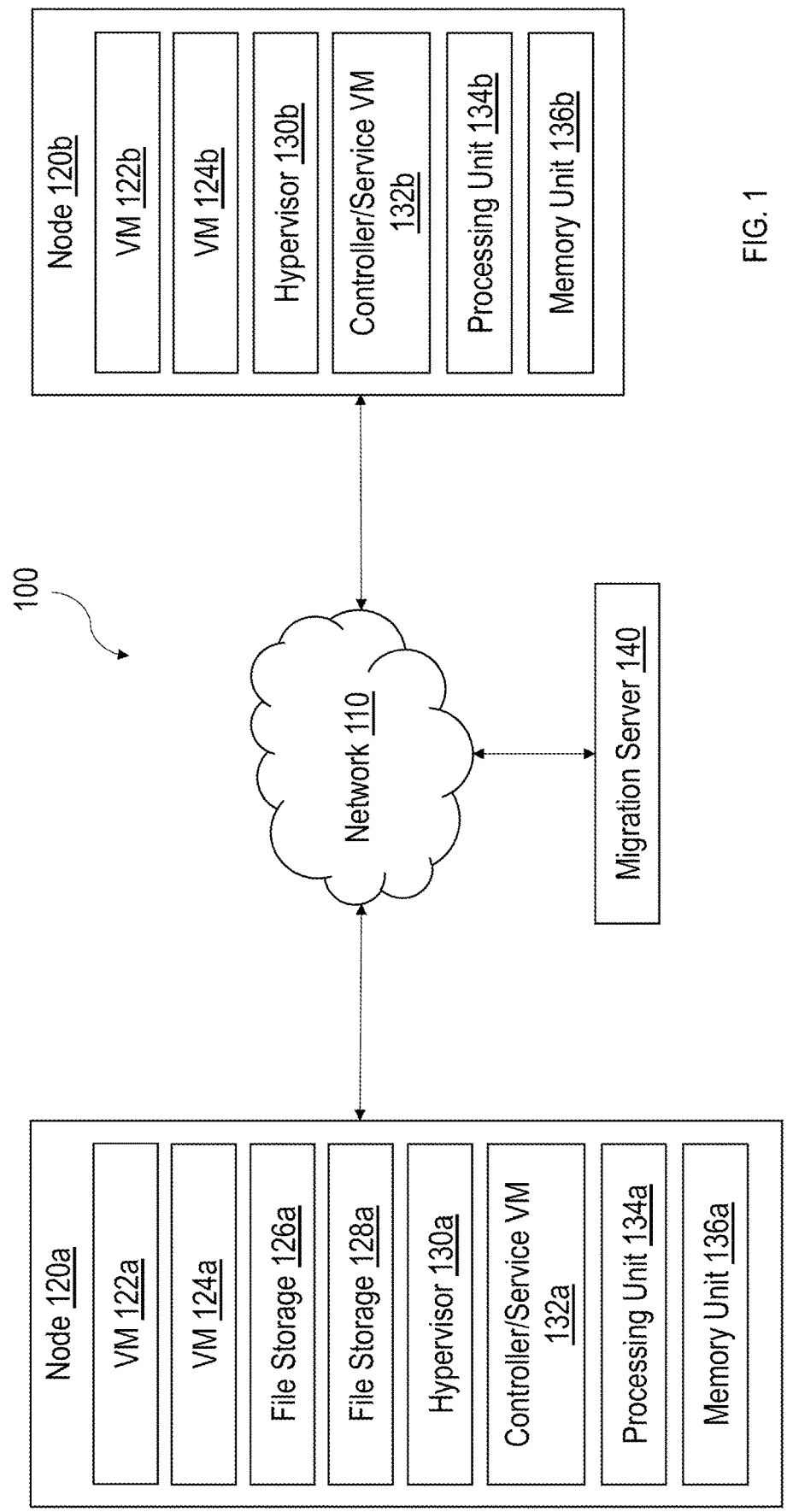
FIG. 1 is a block diagram of a system including various nodes supporting VMs and file storages (e.g., vDisks), in accordance with some implementations of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. A variety of management and non-management related operations may be performed on the virtual machine.

Some virtual computing system can include compute only (CO) nodes as well as hyper converged (HC) nodes. CO nodes differ from HC nodes in that they only provide virtual machines with computing and RAM, they do not provide storage. The system provides storage for virtual disks over the network by hosting on a HC node in the cluster. Thus, the system provides some nodes with compute resources only (CO nodes) and others with both compute and storage resources (HC nodes).

While such virtual computing systems have advantages, technical problems exist. For example, in a system where only some nodes provide storage, there may be input-output (IO) bottlenecks and reduced throughput. Such problems present challenges for virtual machines on the CO nodes.

Technical solutions to such problems can include intelligently classifying a virtual disk for virtual machines on CO nodes based on characteristics like whether the disk is an OS disk versus a data disk and other characteristics. The classifications used can be indicators of IO patterns on the virtual disks. For example, boot disks typically only perform IO in a certain expected range but data disks for a database often do many orders of magnitude heavier IO. With such classifications, the system can assign the virtual disks to HC nodes for both initial and dynamic hosting in a way that allows the overall IP demand on each HC node to be spread out as evenly as possible. Thus, the present disclosure provides a system with decreased probability of IO bottlenecks and increases cluster-wide storage throughput.

Implementations described herein relate to a scheme for optimizing virtual migration of a VM or a file storage (e.g., a vDisk). Applicant has observed that conventional VM systems have various technical problems related to migrating VMs and file storages, including and not limited to increased network traffic, poor I/O latency, and poor network performance after VMs/file storages are migrated. These technical issues result from the conventional VM systems' failure to account for network traffic between a VM and a file storage (e.g., a vDisk) associated with (e.g., storing files or data for) the VM. That is, conventional systems consider the short-term benefits of migration (e.g., load balancing) and neglects any long-term effect of such migration on network usage, resulting in poor network performance after the migration.

Implementations described herein provide various technical solutions to such technical problems by minimizing network usage with respect to migration of a VM or a file storage from an origin node to a destination node. An example indicator of network traffic is relative network usage (e.g., as calculated based on an I/O rate over a network) between a VM and an associated vDisk. When a VM is located on a same node as an associated vDisk (e.g., the VM and the associated vDisk are co-located on the same node), the relative network usage is 0 given that the I/O operations between the VM and the associated vDisk are local to that node. When a VM is located on a node different from that on which the vDisk is located (e.g., the VM and the associated vDisk are not co-located), the relative network usage can be determined, for example, by multiplying the I/O rate between the VM and the associated vDisk over the network by a length of time (e.g., a stability period). The implementations described herein factor the relative network usage with respect to the file storages of the VM in determining whether a particular migration plan (including migrating at least a VM and/or migrating at least a file storage) should be executed. In some examples, multiple migration plans can be determined (e.g., based on suitable load balancing algorithms), and the one having the lowest network migration cost is selected. The network migration cost includes at least the relative network usage as described. As such, the implementations disclosed herein provide various improvements over conventional systems, including optimizing efficiency of virtual migration of a VM or a file storage by reducing network traffic related to I/O management, lowering storage I/O latency for VMs, improving I/O rate capabilities for sequential I/O, and so on.

FIG. 1 is a block diagram of a system 100 including various nodes (e.g., nodes 120a and 120b) configured to support VMs 122a, 124a, 122b, and 124b and file storages 126a and 128a, in accordance with some implementations described in the present disclosure. Referring now to FIG. 1, the system 100 corresponds to a datacenter, a cluster, configured to provide computing and storage capabilities for one or more clients (not shown). Services commensurate with the VMs 122a, 124a, 122b, and 124b can be provided to the clients under respective SLAs, which may specify performance requirements. As shown, the system 100 includes a plurality of nodes such as but not limited to, the nodes 120a and 120b for provisioning the VMs 122a, 124a, 122b, and 124b and the file storages 126a and 128a.

In some implementations, each of the nodes 120a and 120b may be a hardware device such as but is not limited to a server. For example, one or more of the nodes 120a and 120b may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other examples, one or more of the nodes 120a and 120b may be another type of device that is suitable for use as a node within the system 100.

As shown, the node 120a includes the VMs 122a and 124a, the file storages 126a and 128a, a hypervisor 130a, a controller/service VM 132a, a processing unit 134a, and a memory unit 136a. The node 120b includes VMs 122b and 124b, a hypervisor 130b, a controller/service VM 132b, a processing unit 134b, and a memory unit 136b.

Each of the VMs 122a, 124a, 122b, and 124b is a software-based implementation of a computing machine. The VMs 122a, 124a, 122b, and 124b emulate functionalities of a physical computer. Specifically, the hardware resources such as but not limited to, the processing units 134a and 134b, the memory units 136a and 136b, storage, etc., of the underlying computers (e.g., the nodes 120a and 120b) are virtualized or transformed by a hypervisor (e.g., the hypervisor 130a and 130b) into the underlying support for each of the VMs (e.g., the VMs 122a, 124a, 122b, and 124b) that may run its own operating system (OS) and applications on the underlying physical resources in a manner similar to an actual computer. By encapsulating an entire machine, including CPU, memory, operating system, storage devices, and network devices, the VMs 122a, 124a, 122b, and 124b can be configured to be compatible with standard OSs (e.g. Windows, Linux, etc.), applications, and device drivers.

Each of the file storages 126a and 128a is a software-based implementation of a storage associated with (e.g., storing files for) a VM. An example of the file storages 126a and 128a is a vDisk. In some examples, a vDisk is a logical storage (e.g., including contiguous data chunks) virtualized from local storage devices (e.g., the memory unit 136a).

In some implementations, a file storage can be co-located with (located on a same node as) the VM for which the file storage stores files or data. For example, the file storage 126a may be associated with (stores files or data for) the VM 122a. In that regard, the node 120a is a hyperconverged node, which is capable of provisioning both a VM and a file storage. The VM 122a is configured to handle communications (e.g., I/O operations) in connection with the file storage 126a. Examples of types of I/O operations or actions include but are not limited to, cache reference, Dynamic random-access memory (DRAM) access, memory (e.g., Solid State Drive (SSD)) read, memory (e.g., SSD) write, disk seek, sending packets over the network 110, and so on. Given that the VM 122a and the associated file storage 126a are co-located, the I/O communications between the VM 122a and the associated file storage 126a are local to the node 120a and therefore do not need to be routed via the network 110.

In some implementations, a file storage may be located on a different node as that of the VM for which the file storage stores files or data. For example, the file storage 128a may be associated with (stores files or data for) the VM 122b. In some examples, the node 120b may be a compute-only node, which is capable of provisioning a VM but not any file storages. The VM 122b is configured to handle communications (e.g., I/O operations) in connection with the file storage 128a. Given that the VM 122b and the associated file storage 128a are not co-located, the I/O communications between the VM 122b and the associated file storage 128a are routed via the network 110.

While the VMs 122a, 124a, 122b, and 124b are shown to be located on the nodes 120a and 120b, fewer or greater number of VMs can be supported by each of the nodes 120a and 120b. While the file storages 126a and 128a are shown to be located on the nodes 120a and 120b, one of ordinary skill in the art can appreciate that each of the VMs 122a, 124a, 122b, and 124b is associated with one or more file storages (e.g., one or more vDisks).

The VMs 122a, 124a, 122b, and 124b may be managed by the hypervisors 130a and 130b. Each of the hypervisors 130a and 130b is a virtual machine monitor that allows a single physical server computer to run multiple instances of VMs. For example, the node 120a can run the VMs 122a and 124a. The VMs 122a and 124a share the resources of that physical server computer (the node 120a, including the processing unit 134a and the memory unit 136a), potentially across multiple environments. By running multiple VMs on a node, multiple workloads and multiple OSs may be run on a single piece of underlying hardware computer to increase resource utilization and manage workflow.

In some examples, the VMs 122a, 124a, 122b, and 124b are controlled and managed by the controller/service VMs 132a and 132b. The controller/service VMs 132a and 132b are configured to communicate with each other via the network 110 to form a distributed system. The hypervisors 130a and 130b may be configured to run virtualization software such as but not limited to, ESXi from VMWare, AHV from Nutanix, Inc., XenServer from Citrix Systems, Inc., etc., for running the VMs 122a, 124a, 122b, and 124b, for managing the interactions among the VMs 122a, 124a, 122b, and 124b, and for managing the underlying hardware of the nodes 120a and 120b. The controller/service VMs 132a and 132b and the hypervisors 130a and 130b may be configured as suitable for use within the system 100.

The controller/service VMs 132a and 132b are configured to manage, route, and otherwise handle workflow requests to and from the VMs 122a, 124a, 122b, and 124b. For example, the controller/service VM 132a is configured to manage, route, and otherwise handle workflow requests to and from the VMs 122a and 124a. The controller/service VMs 132a and 132b are connected to the network 110 to facilitate communications among the nodes 120a and 120b, and thus to facilitate communications among the VMs 122a, 124a, 122b, and 124b. Although not shown, in some implementations, the hypervisors 130a and 130b may also be connected to the network 110.

The network 110 may include one or more of a cellular network, Wi-Fi, Wi-Max, ZigBee, Bluetooth, a proprietary network, Ethernet, one or more twisted pair wires, coaxial cables, fiber optic cables, local area networks, Universal Serial Bus ("USB"), Thunderbolt, or any other type of wired or wireless network, or a combination thereof. The network 110 may be structured to permit the exchange of data, instructions, messages, or other information among the nodes 120a and 120b (e.g., among the VMs 122a, 124a, 122b, and 124b, between a VM and a file storage, between the controller/service VMs 132a and 132b, and/or between the hypervisors 130a and 130b).

Each of the nodes 120a and 120b may be configured to communicate and share resources with each other via the network 110. For example, the nodes 120a and 120b may communicate and share resources with each other via a respective controller/service VM and/or a respective hypervisor. One or more of the nodes 120a and 120b may also be organized in a variety of network topologies, and each of the nodes 120a and 120b may be termed as a "host" or "host machine." In that regard, each of the nodes 120a and 120b may have suitable network devices configured to allow the nodes 120a and 120b to communicate via the network 110.

Each of the nodes 120a and 120b may include processing units 134a and 134b, respectively, configured to execute instructions. The instructions may be carried out by a special purpose computer, logic circuits, or hardware circuits of the nodes 120a and 120b. The processing units 134a and 134b may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 134a and 134b, thus, execute an instruction, meaning that they perform the operations called for by that instruction. The VMs 122a, 124a, 122b, and 124b, the hypervisors 130a and 130b, and the controller/service VM 132a and 132b can be implemented with the processing units 134a and 134b. Each of the nodes 120a and 120b may include memory units 136a and 136b, respectively, configured to store data. Examples of each of the memory units 136a and 136b include but are not limited to, DRAM, SSD, and the like.

In some implementations, a migration server 140 is configured to manage migration of one or more of the VMs 122a, 124a, 122b, and 124b and the file storages 126a and 128a in the manner described. In some implementations, the migration server 140 may determine a migration plan, which includes migrating at least one of the VMs 122a, 124a, 122b, and 124b and/or migrating at least one of the file storages 126a-128a for a given migration. The migration plan designates, for example, which of the VMs 122a, 124a, 122b, and 124b and the file storages 126a and 128a is to be migrated and which node is a candidate destination node. The migration server 140 is further configured to determine a network migration cost for the migration plan in the manner described. Based on the network migration cost, the migration server 140 determines whether to execute the migration plan.

The migration server 140 is connected to the node 120a (e.g., the hypervisor 130a) and the node 120b (e.g., the hypervisor 130b) over the network 110 for facilitating migrations. The migration server 140 includes processing capabilities, implemented in hardware, firmware, software, or any combination thereof to execute instructions. The instructions may be written using one or more programming language, scripting language, assembly language, etc. The migration server 140, thus, executes an instruction, meaning that the migration server 140 may perform the operations called for by that instruction.

In migrating a VM, the migration server 140 can copy or at least facilitates copying of state data (e.g., OS states) of the VM from an origin node to a destination node via the network 110. With respect to live connections, the migration server 140 can facilitate migration live connection on the VM via at least one of proxies and virtual private networks (VPNs) based on forwarding stubs. Similarly, the migration server 140 can copy or at least facilitates copying of data and files of the file storage from an origin node to a destination node via the network 110.

Implementations described herein reconciles benefits of migrating a VM or a file storage (e.g., hotspot reduction, load balancing, and the like) with a network migration cost. As used herein, a network migration cost is indicative of an overall change in network usage as a result of migrating one or more VMs and/or one or more file storages. In other words, by determining the network migration cost, the changes to global network traffic attributed to migrating a VM or a file storage is accounted for when determining whether to move a VM or a file storage to a destination node. A migration to a proposed destination node with the least increase in network migration cost (e.g., global network usage) or with the most decrease in network migration cost is preferable.

As used herein, a relative network usage is a parameter indicative of an amount of network traffic between the VM and a file storage (e.g., a vDisk) associated with the VM. Given that a given VM may have multiple file storages (e.g., multiple vDisks), network usage can be determined with respect to each of the multiple file storages. In that regard, the relative network usage concerning a VM is the sum of network usage determined with respect to all file storages that store files for the VM.

In some examples, the implementations described herein can be characterized using the following expressions. $R(v, d)$ is a communication rate (e.g., the I/O rate in B/s) between VM v and vDisk d over a network. $D(v)$ corresponds to a set of one or more vDisks associated with VM v. $R(v, d)$ and $D(v)$ are parameters obtainable from a data I/O manager of the hypervisor of the origin node. In some examples, $p(v) \in N$ is a placement variable identifying of a next candidate destination node (out of a number of candidate destination nodes) that is being considered for hosting VM v. In some examples, $p(d) \in N$ are placement variables identifying of a next candidate destination node (out of N candidate destination nodes) that is being considered for hosting vDisk d. In some examples, $r(v, d) \in \{0, R(v, d)\}$ is the relative network usage rate (e.g., a rate of storage network traffic) between VM v and vDisk d. In some examples, the relative network usage rate $r(v, d)$ can be characterized as:

$$r(v,d)=0 \leftrightarrow p(v)=p(d) \quad (1);$$

which means that when the VM v and vDisk d are co-located on a same candidate destination node, the relative network usage rate is 0. In some examples, the relative network usage rate $r(v, d)$ can be characterized as:

$$r(v,d)=R(v,d) \leftrightarrow p(v) \neq p(d) \quad (2);$$

which means that when the VM v and vDisk d are located on separate nodes, the relative network usage rate is the communication rate $R(v, d)$ between VM v and vDisk d over a network.

In some examples, responsive to a VM being migrated to another node, the network is used to copy the data (e.g., VM state data) of the VM from the origin node to the destination node to complete the migration. Similarly, data is copied over the network when a file storage (e.g., a vdisk-backing file storage) is migrated. The amount of data to be copied over the network that is a part of the migration process itself (e.g., directly related to the migration) of a VM or a file storage is referred to as a direct migration cost. The direct migration cost may be a short-term network performance penalty.

In some examples, the direct migration cost of migrating a VM can be represented by m(v). An expression defining m(v) can be, for example:

$$\forall v \in V, m(v)=M(v) \text{ iff } P(v) \neq p(v), 0 \text{ otherwise} \quad (3);$$

where P(v) represents the origin node, and p(v) represents a next candidate destination node for hosting the VM. Expression (3) shows that when the origin node is not the next candidate destination node (e.g., when the VM is migrated from the origin node), the direct migration cost m(v) equals to M(v), which represents VM data copied when migrating to from P(v) to p(v). In some examples, M(v) corresponds to memory configured or allocated for the hosting the VM. In other examples, M(v) corresponds to memory actually used for hosting the VM instead of memory configured or allocated for the VM, given that the origin node may not transfer unused memory state of the VM to the destination node, as the memory at the source node may be over-provisioned. The memory actually used for hosting the VM can be determined by subtracting the memory configured or allocated for the hosting the VM by pages exceeding some threshold of a dirty page rate.

In some examples, the direct migration cost of migrating a vdisk-backing file storage can be represented by m(d). An expression defining m(d) can be, for example:

$$\forall d \in D, m(d)=WSS(d) \text{ iff } P(d) \neq p(d), 0 \text{ otherwise} \quad (4);$$

where P(d) represents the origin node on which the file storage is located, and p(d) represents a next candidate destination node for hosting the file storage, as described. Expression (4) shows that responsive to determining that the origin node is not the next candidate destination node (e.g., when the file storage is migrated), the direct migration cost m(d) equals to WSS(d), which is used to denote data copied when migrating the file storage from P(d) to p(d). In some examples, WSS(d) is used to represent an amount of data transferred from P(d) to p(d) over time when migrating the file storage. WSS(d) can be collected by a data I/O manager of the hypervisor of the origin node. In some examples, direct migration cost of a file storage m(d) accounts for a data-locality loss as the file storage (e.g., a vDisk) and the VM may be temporarily located on separate nodes. In other examples, data-locality loss is not considered when determining m(d).

In some examples, the network migration cost can be defined as a sum of all changes in network usage for all VMs and file storages impacted by the migration, including, for each impacted VM, the direct migration cost of migrating a VM m(v), direct migration cost of migrating a file storage m(d), and relative network usage between VM v and vDisk. For example, the network migration cost (O) can be determined using the following expression:

$$O = \Sigma_{v \in V}(m(v) + \Sigma_{d \in D(v)}(m(d) + r(v,d) \times T)) \quad (5);$$

where the term r(v, d)×T represents relative network usage between VM v and vDisk d over a network, as the relative network usage is the product of the relative network usage rate r(v, d) and a stability period T. In some examples, a length of the stability period T is selected based on an average amount of time that the VM v or vDisk d resides on a given node before the next migration (e.g., as triggered by any load balancing features). In other examples, the stability period T is selected based on other suitable factors. In some examples, the stability period T has a predefined length (e.g., 0.5 hour, 1 hour, 1.5 hours, 2 hours, and the like).

The term m(d)+r(v,d)×T represents a sum of data communicated over the network with respect to a given file storage d, given that the direct migration cost of the file storage m(d) is added to the relative network usage between VM v and vDisk d over a network. The term $\Sigma_{d \in D(v)}$(m(d)+r(v,d)×T) represents that the sum of data communicated over the network with respect to a given file storage d is calculated for the entire set of file storages d∈D(v).

The term m(v)+$\Sigma_{d \in D(v)}$(m(d)+r(v,d)×T) represents the network migration cost with respect to a given impacted VM v given that the direct migration cost of a VM m(v) is added to the term $\Sigma_{d \in D(v)}$(m(d)+r(v,d)×T). The overall expression (5) represents that the network migration cost with respect to all impacted VMs are summed to obtain the network migration cost (O).

In additional implementations, expression (5) can be further augmented to take into account network communications among the VMs. For example, X(v,x) is a communication rate (e.g., data exchange rate in B/s) between VM v and another VM x over a network. With respect to each VM v, x(v, x) is determined for each VM x in communication with VM v, where x(v, x)=X(v, x) if VM v and VM x communicate over the network.

FIGS. 2A and 2B illustrate an example application of migration optimization involving the network migration cost, for example, as described using expressions (1)-(5). FIG. 2A is a block diagram illustrating example locations of VMs 220a-220c and vDisks 230a, 230b, 231c, and 232c before one or more VMs (e.g., $VM_a$ 220a and $VM_c$ 220c) are migrated according to some arrangements. FIG. 2B is a block diagram illustrating example locations of VMs 220a-220c and vDisks 230a, 230b, 231c, and 232c after one or more VMs (e.g., $VM_a$ 220a and $VM_c$ 220c) are migrated according to some arrangements. Referring to FIGS. 1-2B, node A 210a is a node such as but not limited to, the node 120b. For example, node A 210a may be a compute-only node configured to support one or more VMs without supporting any file storages 0. Each of node B 210b, node C 210c, and node D 210d is a node such as but not limited to, the node 120a. For example, each of the nodes 210b-210d is a hyperconverged node capable of supporting one or more file storages in addition to any VMs.

As shown in FIG. 2A (prior to migration), $VM_c$ 220c is located on node A 210a. $VM_b$ 220b and file storage (e.g., $vDisk_b$ 230b) associated with (e.g., storing files for) $VM_b$ 220b are co-located on node B 210b. File storage (e.g., $vDisk_{c1}$ 231c) associated with (e.g., storing files for) $VM_c$ 220c is located on node C 210c. $VM_a$ 220a, file storage (e.g., $vDisk_a$ 230a) associated with (e.g., storing files for) $VM_a$ 220a, and file storage (e.g., $vDisk_{c2}$ 232c) associated with (e.g., storing files for) $VM_c$ 220c are co-located on node D 210d.

Some VMs in FIGS. 2A and 2B communicate (e.g., performing I/O operations) with an associated file storage via a network (not shown) such as but not limited to, the network 110. For example, as shown in FIG. 2A, $VM_c$ 220c communicates with associated file storages $vDisk_{c1}$ 231c and $vDisk_{c2}$ 232c via the network.

The example migration plan with regard to FIGS. 2A and 2B includes migrating $VM_a$ 220a to from node D210d to node A 210a and migrating $VM_c$ 220c from node A 210a to node D 210d. While two VMs 220a and 220c are migrated in the example migration plan shown in FIGS. 2A and 2B, one or more of the vDisks 230a, 230b, 231c, and 232c and be likewise migrated as part of a migration plan. Given that the network migration cost determination is concerned with relative network usage between a VM and a file storage, the network migration cost determination (e.g., the expressions (1)-(5)) is likewise applicable when a vDisk is migrated.

The nodes 210a and 210d are candidate destination nodes in the example migration plan with regard to FIGS. 2A and 2B. In some implementations, such migration plan is determined by the migration server 140 based on a suitable load-balancing algorithm, for example, in an attempt to reduce hotspots. In some implementations, such migration plan is determined by the migration server 140 based on based on a size of the VM and a size of available memory on the candidate destination node. For example, a horizontal length of a block representing each of the nodes 210a-210d represents a size of available memory on a respective one of the nodes 210a-210d. A horizontal length of a block representing each of the VMs 220a-220c represents a size of a respective one of the VMs 220a-220c. The size of a VM may be an allocated size or an actual size. Node C 210c does not have sufficient available memory to support $VM_a$ 220a, thus $VM_a$ 220a can potentially be migrated to the nodes 210a and 210b. $VM_c$ 220c can potentially be migrated to any of the nodes 210b-210d.

For instance, the relative network usage between a VM and an associated file storage is minimal (e.g., 0) responsive to determining that the VM and the associated file storage are co-located on a same node because the communications between the VM and the associated file storage is performed locally without using a network. As shown in FIGS. 2A (prior to migration) and 2B (subsequent to migration), the relative network usage between VMb 220b and vDiskb 230b is 0 prior to migration and subsequent to migration because VMb 220b and vDiskb 230b are co-located on node B 210b before and after migration of VMa 220a and VMc 220c. In that regard, the change of relative network usage concerning VMb 220b and vDiskb in view of the proposed migration plan is 0.

As shown in FIG. 2A (prior to migration), the relative network usage between VMa 220a and vDiska 230a is 0 because VMa 220a and vDiska 230a are co-located before the migration of VMa 220a and VMc 220c. As shown in FIG. 2B (subsequent to migration), the relative network usage between VMa 220a and vDiska 230a is greater than 0 because VMa 220a and vDiska 230a are located on different nodes subsequent to the migration of VMa 220a and VMc 220c. In that regard, the change in relative network usage concerning VMa 220a in view of the proposed migration plan is the post-migration relative network usage between VMa 220a and vDiska 230a.

As shown in FIG. 2A (prior to migration), the relative network usage between VMc 220c and vDiskc1 231c is greater than 0 because VMc 220c and vDiskc1 231c are located on separate nodes before the migration of VMa 220a and VMc 220c. As shown in FIG. 2A (prior to migration), the relative network usage between VMc 220c and vDiskc2 232c is greater than 0 because VMc 220c and vDiskc2 232c are located on separate nodes before the migration of VMa 220a and VMc 220c.

As shown in FIG. 2B (subsequent to migration), the relative network usage between VMc 220c and vDiskc1 231c is greater than 0 because VMc 220c and vDiskc1 231c are located on separate nodes subsequent the migration of VMa 220a and VMc 220c. As shown in FIG. 2B (subsequent to migration), the relative network usage between VMc 220c and vDiskc2 232c is 0 because VMc 220c and vDiskc2 232c are co-located subsequent to the migration of VMa 220a and VMc 220c. In that regard, the change of relative network usage concerning VMc 220c and vDiskc1 231c/vDiskc2 232c in view of the proposed migration plans equals to the post-migration relative network usage between VMc 220c and vDiskc1 231c subtracted by a sum of the pre-migration relative network usage between VMc 220c and vDiskc1 231c and the pre-migration relative network usage between VMc 220c and vDiskc2 232c.

Based on a size of VMa 220a, VMa 220a can potentially be located on node B 210b or node D 210d (if VMb 220b or VMc 220c are migrated away from node B 210b or node D 210d to make room given the limitation on available memory). However, VMa 220a being located on node B 210b or node D 210d could increase the network migration cost if the network usage rate between VMc 220c and vDisk2 232c is greater than VMa 220a and vDiska 230a.

In addition, the migration plan as shown in FIGS. 2A and 2B may be selected to be executed in the scenario in which the relative network usage rate (e.g., the I/O rate) between VMc 220c and vDiskc2 232c is higher than the relative network usage rate (e.g., the I/O rate) between VMc 220c and vDiskc1 231c. A VM being co-located with an associated vDisk that has the highest relative network usage rate among all associated vDisks for that VM leads to a lower network migration cost, for example, as determined using expression (5). That is, as a consequence of the migration optimization as described herein, VMs having a lower relative network usage rate are preferred candidates for compute-only nodes, and a VM is placed on a node that hosts one of the associated vDisks having the highest relative network usage rate whenever possible.

FIG. 3 is a flowchart outlining operations for a method for optimizing virtual migration, in accordance with some implementations of the present disclosure. Additional, fewer, or different operations may be performed in the method depending on the implementation and arrangement. Referring to FIGS. 1-3, the method 300 includes monitoring network usage between all VMs and associated file storages in a given system (e.g., the system 100 or the system shown in FIGS. 2A and 2B) and determining VM/file storage placement that minimize network usage using the network migration cost scheme as described herein.

At 310, the migration server 140 monitors node usage for nodes (e.g., the nodes 120a, 120b, and 210a-210d) in a given system (e.g., the system 100 or the system shown in FIGS. 2A and 2B). Monitoring of node usage may be performed under a suitable load-balancing algorithm to reduce hotspots. For example, the migration server 140 may be in communication with each of the nodes in the system to receive usage data (e.g., CPU usage, memory usage, and the like) to determine whether a particular node is a hotspot.

At 320, the migration server 140 determines whether the node usage of one or more nodes exceeds a predetermined threshold. In one example, the predetermined threshold with regard to CPU usage is 85% of the total CPU capacity. In one example, the predetermined threshold with regard to memory usage is 100% of the total memory capacity. Blocks 310 and 320 are example triggers for determining the migration plan as described with respect to block 330. Other triggers (e.g., other types of load-balancing) algorithms can be likewise implemented. Responsive to determining that the node usage does not exceed the threshold (320:NO), the method 300 returns to 310.

On the other hand, responsive to determining that the node usage exceeds the threshold (320:YES), the migration server 140 determines a migration plan to offload the hotspot nodes at 330. The migration plan (e.g., as shown in FIGS. 2A and 2B) may include migrating at least a VM from a first origin node (e.g., a hotspot node) to a first candidate destination node over a network (e.g., the network 110) and/or migrating a file storage from a second origin node (e.g., a hotspot node) to a second candidate destination node. The migration plan may identify VM(s) and/or file storage(s) to be migrated and a candidate destination node for each of the VM(s) and/or file storage(s) to be migrated. In some examples, the migration plan can be determined based on a load-balancing algorithm. For example, the VM(s) and/or file storage(s) to be migrated is previously located on a hotspot node. In some examples, the migration plan (e.g., the candidate destination nodes) can be determined based on a size of the VM/file storage and a size of available memory on each of the candidate destination nodes. That is, each candidate destination node for a particular VM/file storage has sufficient available memory to support that VM/file storage. In some examples, the migration plan (e.g., the candidate destination nodes) can be determined based on processing requirements (e.g., an amount of processing power needed when located on the origin node) of the VM/file storage and an amount of available processing power on each of the candidate destination nodes. That is, each candidate destination node for a particular VM/file storage has sufficient available processing power to support that VM/file storage.

At 340, the migration server 140 optimizes network efficiency of the migration plan by determining a network migration cost for the migration plan. The network migration cost can be determined using at least the expressions (1)-(5). For example, for each VM, the migration server 140 is configured to determine a first relative network usage indicative of an amount of network traffic communicated over the network between the VM and each of one or more associated file storages when the VM is located on a first candidate destination node. For each file storage, the migration server 140 is further configured to determine a second relative network usage indicative of an amount of network traffic communicated over the network between the file storage and an associated VM when the file storage is located on the second candidate destination node.

In response to determining that an associated file storage of is located on a node different from the candidate destination node, the network usage indicative of the network traffic between the VM and the file storage is greater than 0. In particular, the relative network usage is determined by multiplying a stability period by a relative network usage rate between the VM and the associated file storage in the manner described. The first relative network usage rate includes an I/O rate for communications between the VM and the associated file storage over the network. On the other hand, in response to determining that the VM and the associated file storage are co-located on the same candidate destination node, the relative network usage indicative of the amount of network traffic between the VM and the associated file storage is 0.

In some examples, the network migration cost includes at least a direct migration cost of migrating each VM. The direct migration cost of migrating the VM corresponds to an amount of data to be copied over the network in migrating the VM from the first origin node to the first candidate destination node. The direct migration cost of migrating the VM includes VM state data. As described, the direct migration cost of migrating the VM is 0 in response to determining that, in the migration plan, the VM remains on a same node as the first origin node on which the VM is currently located.

In some examples, the network migration cost includes at least a direct migration cost of migrating each of the one or more associated file storages and the relative network usage indicative of the amount of network traffic between the VM and each of the one or more associated file storages when the VM is located on the first candidate destination node. The direct migration cost of migrating each of the one or more associated file storages corresponds to an amount of data to be copied over the network in migrating each of the one or more file storages. As described, the direct migration cost of migrating an associated file storage is 0 in response to determining that, in the migration plan, the associated file storage remains on a same node as a current node on which the associated file storage is currently located.

At 350, the migration server 140 selects to execute the migration plan based on the network migration cost. In some examples, the migration server 140 selects to execute the migration plan in response to determining that the network migration cost is below a predetermined threshold. In some examples, the migration server 140 selects to execute the migration plan in response to determining that the migration plan has the least network migration cost among the network migration costs for all other proposed migration plans.

FIG. 4 illustrates a virtual computing system 400 including compute only (CO) nodes 410 and 420 and hyper converged (HC) nodes 430 and 440. CO node 410 includes a virtual machine (VM) 442 and a VM 446. CO node 420 includes a VM 446, a VM 448, and a VM 452. HC node 430 includes a VM 456 and a VM 460. The VM 456 is coupled to a file storage device 462. The VM 460 is coupled to a file storage device 466. It should be noted that the VM 442 utilizes the file storage device 462 in HC node 430 because CO node 410 does not have a file storage facility. Similarly, VM 446 on CO node 420 uses file storage device 466 in HC node 430. The file storage devices can be referred to as virtual disks or "vdisks."

HC node 440 includes a VM 470 and file storage devices 472 and 474. The VM 470 is coupled to the file storage device 474. VM 448 and VM 452 on CO node 420 utilize the file storage device 474 on HC node 440. Similarly, VM 444 on CO node 410 uses the file storage device 472 on HC node 440. The virtual computing system 400 can include any number of CO nodes and HC nodes. The virtual machines hosted by CO nodes can store data to file storage devices in HC nodes or other file storage devices coupled to the network.

Migration of virtual machines can include logically "moving" of the virtual machine from one node to another. In some embodiments, the virtual computing system includes a migration server 480 that manages migrations of virtual machines and file storage devices from one node in the network to another. The migration server 480 can be a leader node in the virtual computing system 400 or a separate device tasked with system management. The migration of the virtual machines can follow a migration plan established by the migration server 480 according to a process such as the method described with respect to FIG. 3.

Notwithstanding the components of the virtual computing system 400 shown and described herein, in other embodiments, the virtual computing system 400 include other components and features, as described above with respect to the system 100 of FIG. 1.

Figure 5:
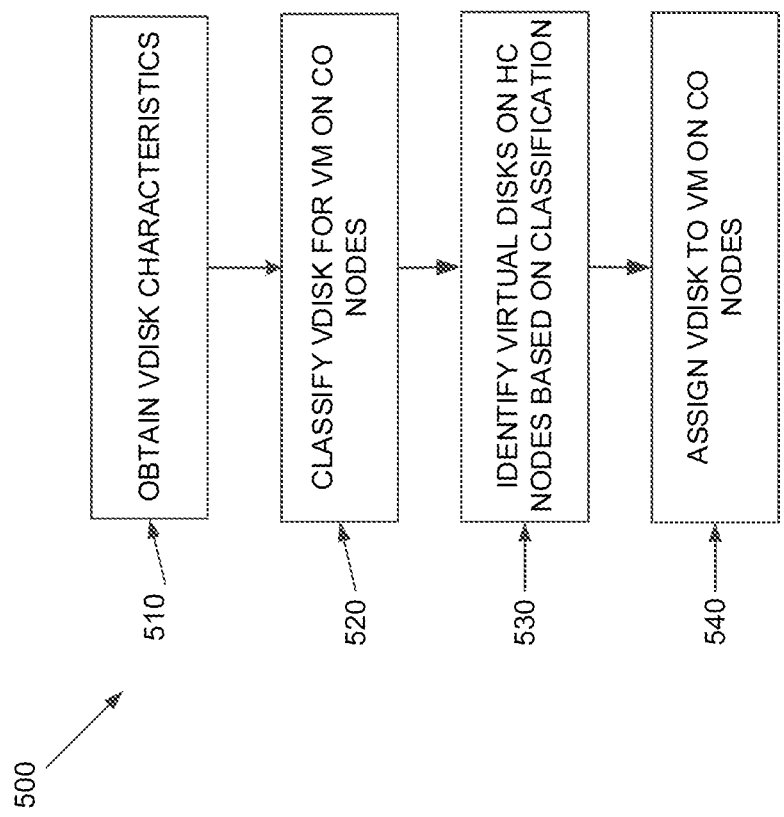
FIG. 5 is an example flowchart outlining operations for improved migration performance including classification of virtual disks accessed by compute only nodes for efficient bin packing across hyper converged nodes, in accordance with some embodiments of the present disclosure.

FIG. 5 is a flowchart outlining operations for a method for improved migration performance including classification of virtual disks accessed by compute only (CO) nodes for efficient bin packing across hyper converged (HC) nodes, in accordance with some implementations of the present disclosure. Additional, fewer, or different operations may be performed in the method depending on the implementation and arrangement.

Referring to FIGS. 1-5, the method 500 includes monitoring network usage between all VMs and associated file storage devices in a given system (e.g., the system 100 in FIG. 1 or the system 400 in FIG. 4), classifying virtual disks for virtual machines on CO nodes in the system based on characteristics and assigning virtual disks to HC nodes as described herein.

At 510, the migration server obtains virtual disk characteristics from the network. Sample virtual disk characteristics can include whether the disk has an operating system (OS) versus is a data disk. Other characteristics indicative of IO patterns on the virtual disks may be used. Book disks, for example, typically only perform IO in a certain expected range but data disks for a database do great IO to many order of magnitude. In an illustrative embodiment, the migration server obtains network metrics from a scheduler that determines system performance and performs system optimization. The scheduler can identify characteristics based on application of migration optimization involving the network migration cost, for example, as described using expressions (1)-(5) described with reference to FIGS. 2A and 2B. Migration costs can include IOPS for VMs and throughput statistics.

At 520, the migration server uses the obtained virtual disk characteristics to classify the virtual disks used by virtual machines operating on CO nodes. As discussed above, CO nodes do not include file storage devices and, as such, machines using CO node resources must find virtual disks on other nodes for storage resources. Classification of virtual disks can improve system performance by identifying virtual disks on HC nodes with certain characteristics and matching the virtual disks with VMs on CO nodes that need those characteristics. In an illustrative embodiment, the migration server is a cluster server that manages VMs in the system. The migration server can optimize system performance by assigning vdisks on one or more HC nodes that optimize throughput and performance.

At 530, the migration server identifies virtual disks on HC nodes with certain classifications and performance attributes. Classification and performance may change over time, requiring the migration server to dynamically adapt identification of the virtual disks over time. The migration server determines which virtual disks to use for each VM and, if needed, where to place VMs in the system to make the greatest difference in system performance based on the performance metrics.

At 540, the migration server assigns virtual disks on HC nodes to particular virtual machines on CO nodes. The assignment can be both for initial and dynamic hosting in a way that allows the overall IO demand on each HC node to be spread out as evenly as possible. Spreading out IO demand reduces the probability of IO bottlenecks and increases cluster-wide storage throughput. In an illustrative embodiment, the migration server is a cluster manager that manages VMs for the entire cluster. Advantageously, the assignment of virtual disks for VMs on CO nodes based on system performance improves overall throughput and IO operations. In some embodiments, the migration server may determine that system performance would improve by migration of the VM from a CO node to an HC node.

The process of obtaining vdisks characteristics, classifying the vdisks, and assigning vdisks continues throughout operation of the system. As such, the optimization of the system is dynamic in that as nodes change performance, the system adapts and modifies to optimize overall performance.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising a processor and a memory, wherein the memory comprises programmed instructions that, when executed by the processor, cause the apparatus to:
 identify, by a management processor of a virtual computing system, a virtual disk hosted on a hyper converged (HC) node of the virtual computing system, the virtual disk storing data for a first virtual machine (VM) hosted on the HC node, and identify a second VM hosted on a compute only (CO) node of the virtual computing system;
 determine, by the management processor, that overall network performance between VMs and virtual disks of the virtual computing system would improve when the virtual disk hosts data for the second VM on the CO node rather than the first VM on the HC node; and
 upon determining that the overall network performance of the virtual computing system improves, assign, by the management processor, the virtual disk to host the data for the second VM on the CO node.

2. The apparatus of claim 1, wherein the memory comprises the programmed instructions that, when executed by the processor, further cause the apparatus to:
 assign a first virtual disk on a first node to host a first portion of the data for the second VM located on the compute only node and a second virtual disk on a second node to host a second portion of the data for the second VM located on the CO node.

3. The apparatus of claim 1, wherein the memory comprises the programmed instructions that, when executed by the processor, further cause the apparatus to:
 determine a first relative network usage indicative of an amount of network traffic communicated over the virtual computing system between the first VM and the virtual disk when the first VM is located on a first candidate destination node.

4. The apparatus of claim 3, wherein the memory comprises the programmed instructions that, when executed by the processor, further cause the apparatus to:
 multiply a stability period by the first relative network usage rate between the first VM and the virtual disk.

5. The apparatus of claim 3, wherein the first relative network usage is based on an I/O rate for communications between the first VM and the virtual disk.

6. The apparatus of claim 1, wherein assigning the virtual disk to host the data for the second VM located on the CO node comprises both initial and dynamic hosting.

7. The apparatus of claim 1, wherein the memory comprises the programmed instructions that, when executed by the processor, further cause the apparatus to:
   migrate, by the management processor, the first VM to a different node based on performance metrics.

8. A non-transitory readable storage medium comprising instructions stored thereon that, when executed by the processor, cause the processor to:
   identify, by a management processor of a virtual computing system, a virtual disk hosted on a hyper converged (HC) node of the virtual computing system, the virtual disk storing data for a first virtual machine (VM) hosted on the HC node, and identify a second VM hosted on a compute only (CO) node of the virtual computing system;
   determine, by the management processor, that overall network performance between VMs and virtual disks of the virtual computing system would improve when the virtual disk hosts data for the second VM on the CO node rather than the first VM on the HC node; and
   upon determining that the overall network performance of the virtual computing system improves, assign, by the management processor, the virtual disk to host the data for the second VM on the CO node.

9. The medium of claim 8, comprising the instructions stored thereon that, when executed by the processor, further cause the processor to:
   assign a first virtual disk on a first node to host a first portion of the data for the second VM located on the CO node and a second virtual disk on a second node to host a second portion of the data for the VM located on the CO node.

10. The medium of claim 8, comprising the instructions stored thereon that, when executed by the processor, further cause the processor to:
    determine a first relative network usage indicative of an amount of network traffic communicated over the virtual computing system between the first VM and the virtual disk when the first VM is located on a first candidate destination node.

11. The medium of claim 10, comprising the instructions stored thereon that, when executed by the processor, further cause the processor to:
    multiply a stability period by the first relative network usage rate between the first VM and the virtual disk.

12. The medium of claim 10, wherein the first relative network usage is based on an I/O rate for communications between the first VM and the virtual disk.

13. The medium of claim 8, wherein assigning the virtual disk to host the data for the second VM located on the CO node comprises both initial and dynamic hosting.

14. The medium of claim 8, comprising the instructions stored thereon that, when executed by the processor, further cause the processor to:
    migrate, by the management processor, the first VM to a different node based on performance metrics.

15. A method comprising:
    identifying, by a management processor of a virtual computing system, a virtual disk hosted on a hyper converged (HC) node of the virtual computing system, the virtual disk storing data for a first virtual machine (VM) hosted on the HC node, and identify a second VM hosted on a compute only (CO) node of the virtual computing system;
    determining, by the management processor, that overall network performance between VMs and virtual disks of the virtual computing system would improve when the virtual disk hosts data for the second VM on the CO node rather than the first VM on the HC node; and
    upon determining that the overall network performance of the virtual computing system improves, assigning, by the management processor, the virtual disk to host the data for the second VM on the CO node.

16. The method of claim 15, further comprising assigning a first virtual disk on a first node to host a first portion of the data for the second VM located on the CO node and a second virtual disk on a second node to host a second portion of the data for the second VM located on the CO node.

17. The method of claim 15, further comprising determining a first relative network usage indicative of an amount of network traffic communicated over the virtual computing system between the first VM and the virtual disk when the first VM is located on a first candidate destination node.

18. The method of claim 17, wherein the first relative network usage is determined by multiplying a stability period by the first relative network usage rate between the first VM and the virtual disk.

19. The method of claim 17, wherein the first relative network usage is based on an I/O rate for communications between the first VM and the virtual disk.

20. The method of claim 15, wherein assigning the virtual disk to host the data for the second VM located on the CO node comprises both initial and dynamic hosting.

* * * * *